United States Patent
Kuo

(10) Patent No.: US 11,941,811 B2
(45) Date of Patent: Mar. 26, 2024

(54) METHOD FOR ASSESSING CARDIOTHORACIC RATIO AND CARDIOTHORACIC RATIO ASSESSMENT SYSTEM

(71) Applicant: China Medical University, Taichung (TW)

(72) Inventor: Chin-Chi Kuo, Taichung (TW)

(73) Assignee: CHINA MEDICAL UNIVERSITY, Taichung (TW)

( * ) Notice: Subject to any disclaimer, the term of this patent is extended or adjusted under 35 U.S.C. 154(b) by 427 days.

(21) Appl. No.: 17/386,683

(22) Filed: Jul. 28, 2021

(65) Prior Publication Data

US 2022/0138947 A1    May 5, 2022

(30) Foreign Application Priority Data

Nov. 5, 2020 (TW) ................................ 109138524

(51) Int. Cl.
*G06N 3/045* (2023.01)
*G06N 3/08* (2023.01)
(Continued)

(52) U.S. Cl.
CPC ........... *G06T 7/0014* (2013.01); *G06N 3/045* (2023.01); *G06T 2207/10116* (2013.01); *G06T 2207/20081* (2013.01); *G06T 2207/20084* (2013.01); *G06T 2207/30048* (2013.01); *G06T 2207/30061* (2013.01)

(58) Field of Classification Search
CPC ......... G06T 7/0014; G06T 2207/10116; G06T 2207/20081; G06T 2207/20084; G06T 2207/30048; G06T 2207/30061; G06N 3/045
See application file for complete search history.

(56) References Cited

FOREIGN PATENT DOCUMENTS

| CN | 111080680 A | 4/2020 |
|---|---|---|
| TW | I709147 B | 11/2020 |

OTHER PUBLICATIONS

Z. Li et al., "Automatic Cardiothoracic Ratio Calculation With Deep Learning," in IEEE Access, vol. 7, pp. 37749-37756, 2019, doi: 10.1109/ACCESS.2019.2900053. (Year: 2019).*

(Continued)

*Primary Examiner* — Bobbak Safaipour
*Assistant Examiner* — Ashley L Hytrek

(57) ABSTRACT

A method for assessing cardiothoracic ratio (CTR) includes following steps. A testing X-ray image database of a subject is provided. A first image data classifying step is performed, wherein the testing X-ray image database is classified by a first deep learning neural network classifier to obtain a testing chest X-ray image data. A second image data classifying step is performed, wherein the testing chest X-ray image data is classified by a second deep learning neural network classifier to obtain a target chest X-ray image data. A feature extracting step is performed, wherein a diameter of thoracic cavity and a diameter of cardiac silhouette of the target chest X-ray image data are captured automatically and then trained to achieve a convergence by a third deep learning neural network classifier. An assessing step is performed, wherein an assessing result of CTR is obtained according to a feature of CTR.

18 Claims, 11 Drawing Sheets
(1 of 11 Drawing Sheet(s) Filed in Color)

(51) Int. Cl.
*G06T 7/00* (2017.01)
*G06T 7/12* (2017.01)

(56) References Cited

OTHER PUBLICATIONS

E. Sogancioglu, K. Murphy, E. Calli, E. T. Scholten, S. Schalekamp and B. Van Ginneken, "Cardiomegaly Detection on Chest Radiographs: Segmentation Versus Classification," in IEEE Access, vol. 8, pp. 94631-94642, 2020, doi: 10.1109/ACCESS.2020.2995567. (Year: 2020).*

* cited by examiner

METHOD FOR ASSESSING CARDIOTHORACIC RATIO AND CARDIOTHORACIC RATIO ASSESSMENT SYSTEM

RELATED APPLICATIONS

This application claims priority to Taiwan Application Serial Number 109138524, filed Nov. 5, 2020, which is herein incorporated by reference.

BACKGROUND

Technical Field

The present disclosure relates to a medical information analysis method and a system thereof. More particularly, the present disclosure relates to a method for assessing cardiothoracic ratio and a cardiothoracic ratio assessment system.

Description of Related Art

Cardiothoracic ratio (CTR) is a ratio of a maximum transverse diameter of the heart (the sum of maximum distances from the left heart border to the midline of the body and the right heart border to the midline of the body) and a transverse diameter of the thoracic cavity (the inner diameter of the horizontal thorax through the top of the right diaphragm) shown on an X-ray image. Normally, the normal value of CTR of adults and children is not greater than 0.5, and at this time, doctors can preliminarily rule out the situation of impaired heart function. By contrast, in the person with chronic heart failure, high blood pressure or chronic kidney disease, the value of CTR is usually greater than 0.5, indicating that the heart thereof may be suffered from hypertrophy. Accordingly, the CTR can be used to initially assess the heart function of a patient and is beneficial to the formulation of subsequent medical plans.

Currently, the assessment of the value of CTR is performed by doctors who manually use scales to calculate the maximum transverse diameter of the heart and the transverse diameter of the thoracic cavity of the chest X-ray image of the patient by the user interface of the current medical imaging system, and then the value of CTR of the patient is calculated based on the aforementioned measured values. However, there is no medical information analysis specifically designed to calculate and provide the value of CTR in real-time. Furthermore, the value of CTR of the same patient is likely to be different due to the subjective interpretation standards of different physicians for the assessment of CTR, resulting in a difference in the accuracy of the value of CTR based on manual interpretation.

Therefore, how to develop an automated, standardized, rapid and highly accurate CTR assessing method is a technical issue with clinical application value.

SUMMARY

According to one aspect of the present disclosure, a method for assessing cardiothoracic ratio (CTR) includes following steps. A testing X-ray image database of a subject is provided. A first image data classifying step is performed, wherein the testing X-ray image database is classified by a first deep learning neural network classifier so as to obtain a testing chest X-ray image data, and the testing chest X-ray image data includes a PA (posterior-anterior view) chest X-ray image data or an AP (anterior-posterior view) chest X-ray image data. A second image data classifying step is performed, wherein the testing chest X-ray image data is classified by a second deep learning neural network classifier so as to obtain a target chest X-ray image data. A feature extracting step is performed, wherein a diameter of thoracic cavity and a diameter of cardiac silhouette of the target chest X-ray image data are captured automatically and then trained to achieve a convergence by a third deep learning neural network classifier so as to obtain a feature of CTR. An assessing step is performed, wherein an assessing result of CTR is obtained according to the feature of CTR by the third deep learning neural network classifier.

According to another aspect of the present disclosure, a cardiothoracic ratio assessment system includes an image capturing device and a processor. The image capturing device is for capturing a testing X-ray image database of a subject. The processor is electronically connected to the image capturing device, wherein the processor includes a reference X-ray image database and a cardiothoracic ratio assessment program, and the reference X-ray image database includes a plurality of reference X-ray image datasets. The cardiothoracic ratio assessment program includes a first reference image data classifying module, a second reference image data classifying module, a training module, a first target image data classifying module, a second target image data classifying module and a comparing module. The first reference image data classifying module is for classifying each of the reference X-ray image datasets by the first deep learning neural network classifier so as to obtain a plurality of training chest X-ray image data, wherein each of the training chest X-ray image data includes a PA chest X-ray image data or an AP chest X-ray image data. The second reference image data classifying module is for classifying the training chest X-ray image data by the second deep learning neural network classifier so as to obtain a plurality of training PA chest X-ray image data. The training module is for capturing a diameter of thoracic cavity and a diameter of cardiac silhouette of each of the training PA chest X-ray image data by a deep learning calculating module automatically, wherein the diameter of thoracic cavity and the diameter of cardiac silhouette of the training PA chest X-ray image data are trained to achieve a convergence by the deep learning calculating module so as to obtain a third deep learning neural network classifier. The first target image data classifying module is for classifying the testing X-ray image database by the first deep learning neural network classifier so as to obtain a testing chest X-ray image data, wherein the testing chest X-ray image data includes a PA chest X-ray image data or an AP chest X-ray image data. The second target image data classifying module is for classifying the testing chest X-ray image data by the second deep learning neural network classifier so as to obtain a target chest X-ray image data. The comparing module is for capturing a diameter of thoracic cavity and a diameter of cardiac silhouette of the target chest X-ray image data by the third deep learning neural network automatically, wherein the diameter of thoracic cavity and the diameter of cardiac silhouette of the target chest X-ray image data are trained to achieve a convergence by the third deep learning neural network so as to obtain a feature of CTR, and an assessing result of CTR is obtained according to the feature of CTR by the third deep learning neural network classifier.

BRIEF DESCRIPTION OF THE DRAWINGS

The patent or application file contains at least one drawing executed in color. Copies of this patent or patent application publication with color drawing(s) will be provided by Office upon request and payment of the necessary fee. The present disclosure can be more fully understood by reading the following detailed description of the embodiment, with reference made to the accompanying drawings as follows.

DETAILED DESCRIPTION

The present disclosure will be further exemplified by the following specific embodiments to facilitate utilizing and practicing the present disclosure completely by the people skilled in the art without over-interpreting and over-experimenting. However, these practical details are used to describe how to implement the materials and methods of the present disclosure and are not necessary.

[Method for Assessing Cardiothoracic Ratio of the Present Disclosure]

Figure 1:
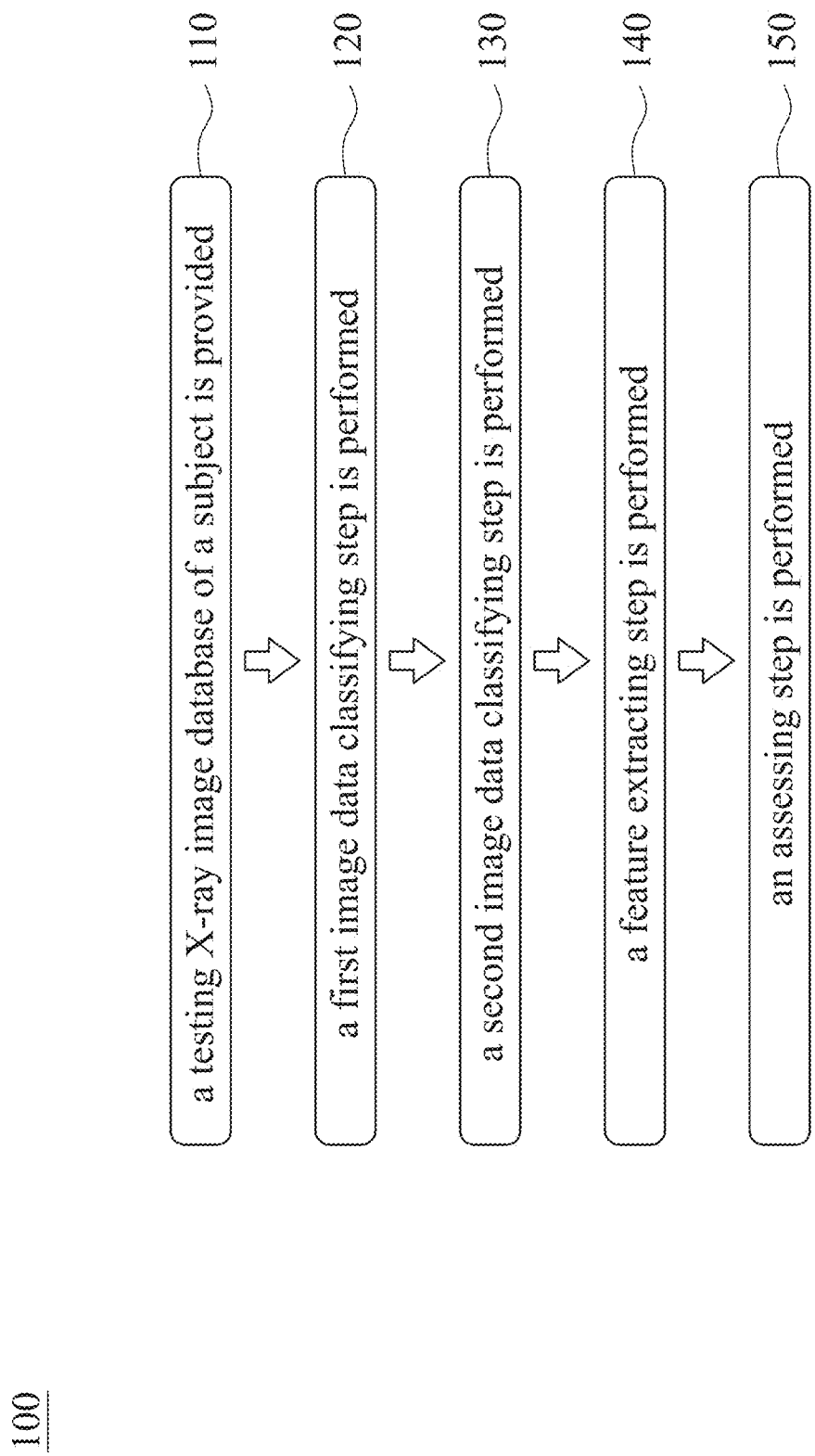
FIG. 1 is a flow chart of a method for assessing cardiothoracic ratio according to one embodiment of the present disclosure.

Please refer to FIG. 1, which is a flow chart of a method 100 for assessing cardiothoracic ratio according to one embodiment of the present disclosure. The method 100 for assessing cardiothoracic ratio includes Step 110, Step 120, Step 130, Step 140 and Step 150.

In Step 110, a testing X-ray image database of a subject is provided. In detail, the testing X-ray image database includes X-ray image data of each body part of the subject in X-ray examinations and includes a chest X-ray image data and a non-chest X-ray image data.

In Step 120, a first image data classifying step is performed, wherein the testing X-ray image database is classified by a first deep learning neural network classifier so as to obtain a testing chest X-ray image data, and the testing chest X-ray image data includes a PA (posterior-anterior view) chest X-ray image data and an AP (anterior-posterior view) chest X-ray image data. In detail, the first deep learning neural network classifier can be used to classify the chest X-ray image data and the non-chest X-ray image data of the testing X-ray image database so as to select the testing chest X-ray image data of the subject for the subsequent analysis. In particular, the first deep learning neural network classifier can be ResNet-50 deep learning neural network classifier.

In Step 130, a second image data classifying step is performed, wherein the testing chest X-ray image data is classified by a second deep learning neural network classifier so as to obtain a target chest X-ray image data. In particular, the second deep learning neural network classifier can be ResNet-50 deep learning neural network classifier, and the target chest X-ray image data can be the PA chest X-ray image data. In detail, the testing chest X-ray image data includes the chest X-ray image data with different examination postures of the subject during the chest X-ray examination, such as the PA chest X-ray image data or the AP chest X-ray image data. Furthermore, in the second image data classifying step, the testing chest X-ray image data will be classified by the second deep learning neural network classifier automatically so as to obtain the PA chest X-ray image data of the subject, and the PA chest X-ray image data will be served as the basis for assessing the CTR of the method 100 for assessing cardiothoracic ratio of the present disclosure. Furthermore, when capturing the chest X-ray image data of the subject, the X-ray beams will emit from the back to the chest of the patient which is in a standing position. At this time, the X-ray beams are parallel to each other, so that the obtained X-ray image data is clearer and with a normal-scale size. Moreover, when capturing the X-ray image data in a standing position, the subject will maintain inhaling at the same time to expand the lungs so as to ensure sufficient inhalation, and then the expansion of the lungs will be maximized. Therefore, the PA chest X-ray image data of the subject will be used as the basis for assessing the CTR of the method 100 for assessing cardiothoracic ratio of the present disclosure so as to obtain the assessing result of CTR with higher accuracy.

In Step 140, a feature extracting step is performed, wherein a diameter of thoracic cavity and a diameter of cardiac silhouette of the target chest X-ray image data are captured automatically and then trained to achieve a convergence by a third deep learning neural network classifier so as to obtain a feature of CTR. In detail, in the method 100 for assessing cardiothoracic ratio of the present disclosure, the third deep learning neural network classifier is used to automatically segment the heart portion and the lung portion of the target chest X-ray image data. Then, a maximum transverse diameter of the thoracic cavity and a maximum transverse diameter of the heart will be marked with short straight lines by the third deep learning neural network classifier so as to capture the diameter of thoracic cavity and the diameter of cardiac silhouette, and then the feature of CTR corresponding thereof will be obtained based thereon.

In Step 150, an assessing step is performed, wherein an assessing result of CTR is obtained according to the feature of CTR by the third deep learning neural network classifier.

Figure 2:
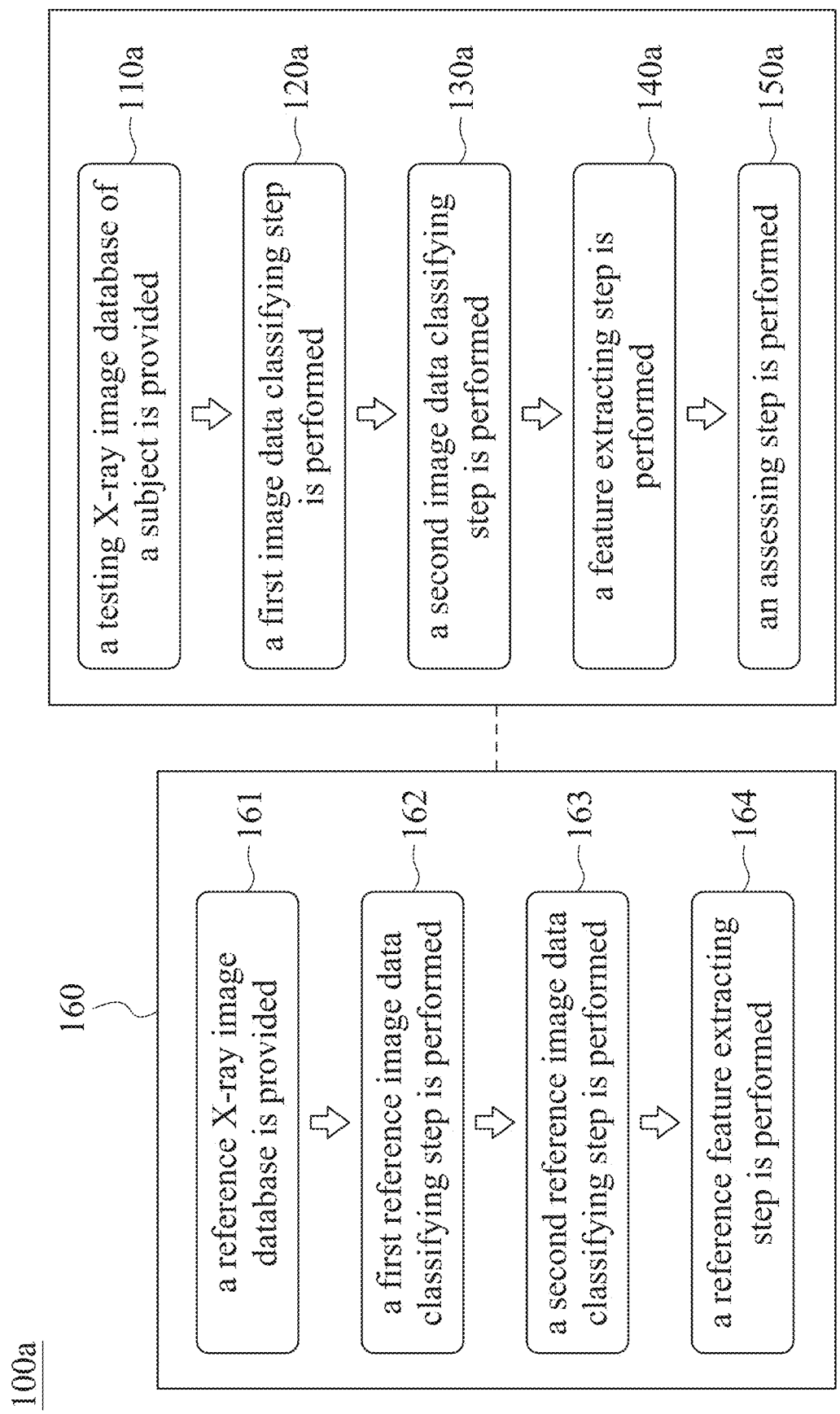
FIG. 2 is a flow chart of a method for assessing cardiothoracic ratio according to another embodiment of the present disclosure.

Please refer to FIG. 2, which is a flow chart of a method 100a for assessing cardiothoracic ratio according to another embodiment of the present disclosure. The method 100a for assessing cardiothoracic ratio includes Step 110a, Step 120a, Step 130a, Step 140a, Step 150a and Step 160, wherein Step 110a, Step 120a, Step 130a, Step 140a and Step 150a are the same as Step 110, Step 120, Step 130, Step 140 and Step 150 of FIG. 1, so that the details thereof are not described therein again. The establishing details of the third deep learning neural network classifier of the present disclosure are illustrated as follows.

In Step 160, a model establishing step is performed, wherein the model establishing step includes Step 161, Step 162, Step 163 and Step 164.

In Step 161, a reference X-ray image database is provided, wherein the reference X-ray image database includes a plurality of reference X-ray image datasets. In detail, each of the reference X-ray image datasets includes the chest X-ray image data with different examination postures (such as the PA chest X-ray image data and the AP chest X-ray image data) and the non-chest X-ray image data (that is, the X-ray image data including the images of the chest and other parts of the body in one X-ray examination), and the chest X-ray image data as well as the non-chest X-ray image data with different examination postures are used for the subsequent analysis by the method 100a for assessing cardiothoracic ratio of the present disclosure.

In Step 162, a first reference image data classifying step is performed, wherein each of the reference X-ray image datasets is classified by the first deep learning neural network classifier so as to obtain a plurality of training chest X-ray image data, and each of the training chest X-ray image data includes a PA chest X-ray image data and an AP chest X-ray image data. In particular, the reference X-ray image datasets include the chest X-ray image data with different examination postures and may include the non-chest X-ray image data (that is, the X-ray image data may include the images of the chest and other parts of the body in one X-ray examination simultaneously), and the first deep learning neural network classifier of the present disclosure can be used to classify the chest X-ray image data and the non-chest X-ray image data of each of the reference X-ray image datasets so as to select the chest X-ray image data as the training chest X-ray image data of the present disclosure for the subsequent analysis.

In Step 163, a second reference image data classifying step is performed, wherein the training chest X-ray image data are classified by the second deep learning neural network classifier so as to obtain a plurality of training PA chest X-ray image data. In detail, each of the reference X-ray image datasets will be classified by the second deep learning neural network classifier automatically so as to obtain the PA chest X-ray image data which is clearer and with a normal-scale size for the following module establishing process.

In Step 164, a reference feature extracting step is performed, wherein a diameter of thoracic cavity and a diameter of cardiac silhouette of each of the training chest X-ray image data are captured automatically and then trained to achieve a convergence by a deep learning calculating module so as to obtain the third deep learning neural network classifier. In detail, the deep learning calculating module can be U-Net calculating module.

Figure 3:
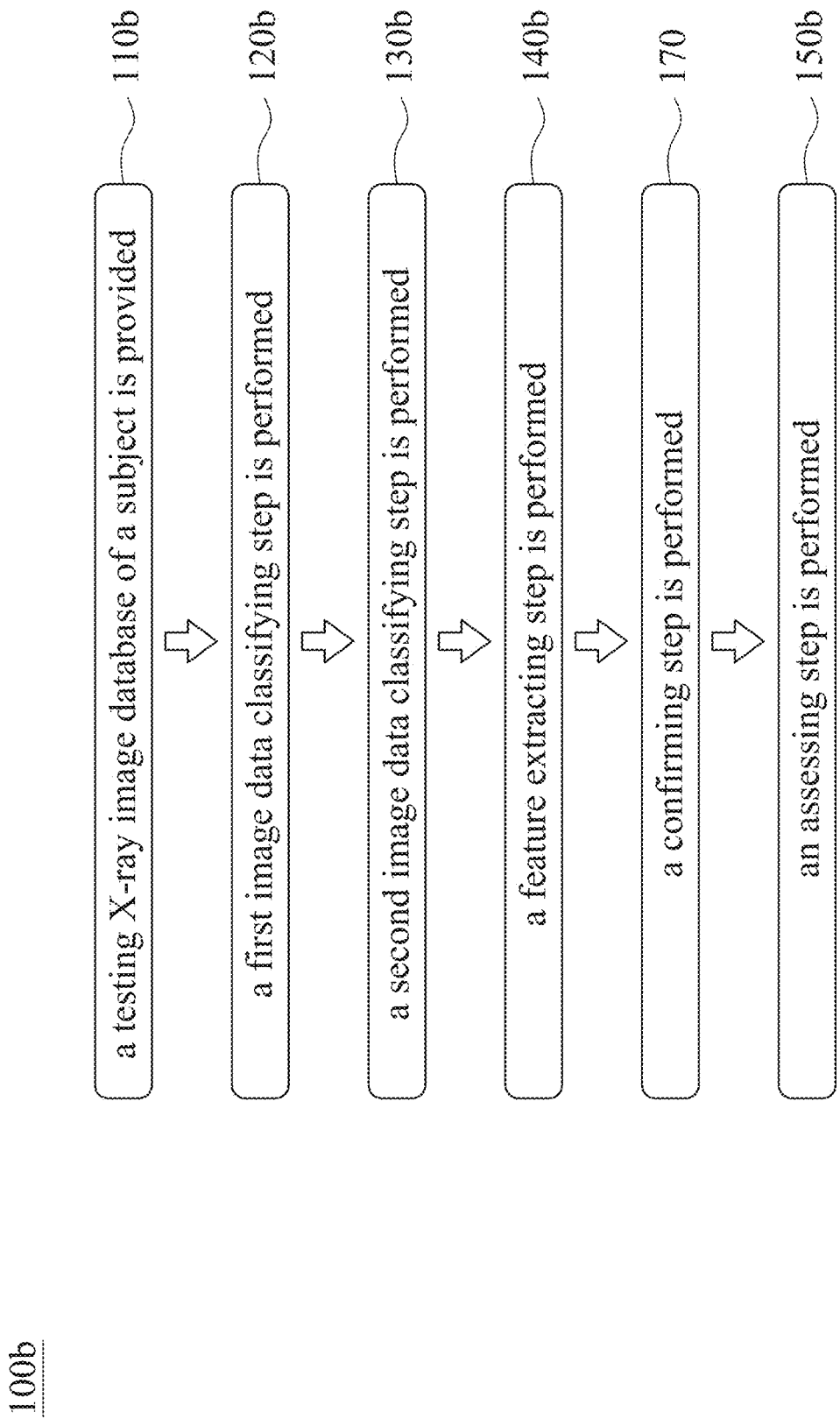
FIG. 3 is a flow chart of a method for assessing cardiothoracic ratio according to further another embodiment of the present disclosure.

Please refer to FIG. 3, which is a flow chart of a method 100b for assessing cardiothoracic ratio according to further another embodiment of the present disclosure. The method 100b for assessing cardiothoracic ratio includes Step 110b, Step 120b, Step 130b, Step 140b, Step 170 and Step 150b, wherein Step 110b, Step 120b, Step 130b, Step 140b and Step 150b are the same as Step 110, Step 120, Step 130, Step 140 and Step 150 of FIG. 1, so that the details thereof are not described therein again.

In Step 170, a confirming step is performed, wherein a chest position and a heart position of the target chest X-ray image data are confirmed by a fourth deep learning neural network classifier, and a reliability warning message is obtained according to the chest position and the heart position by the fourth deep learning neural network classifier. In detail, when the method 100b for assessing cardiothoracic ratio of the present disclosure is used to capture the diameter of thoracic cavity and the diameter of cardiac silhouette of the target chest X-ray image data, and the diameter of thoracic cavity as well as the diameter of cardiac silhouette of the target chest X-ray image data are assessed as unable to be defined clearly by the method 100b for assessing cardiothoracic ratio, at this time, the accuracy of the feature of CTR output thereof should be discussed. Simultaneously, the fourth deep learning neural network classifier will be further used to confirm the chest position and the heart position of the target chest X-ray image data and to determine whether the segments of the chest position and the heart position are complete, smooth and not broken or not, and then the reliability warning message will be output according to the chest position and the heart position by the fourth deep learning neural network classifier. Furthermore, the diameter of thoracic cavity and the diameter of cardiac silhouette of the target chest X-ray image data can be adjusted by an adjuster, such as doctors and other professionals, so as to obtain an adjusted diameter of thoracic cavity and an adjusted diameter of cardiac silhouette. The adjusted diameter of thoracic cavity and the adjusted diameter of cardiac silhouette will be further trained to achieve a convergence by the fourth deep learning neural network classifier so as to obtain a secondary feature of CTR. At the same time, a reliability warning result of CTR can be obtained according to the secondary feature of CTR by the fourth deep learning neural network classifier, so that the assessing result of CTR output by the method 100b for assessing cardiothoracic ratio of the present disclosure can be reconfirmed and optimized again. More preferably, the diameter of thoracic cavity and the diameter of cardiac silhouette of the target chest X-ray image data can be adjusted by the adjuster according to the reliability warning message. In particular, the fourth deep learning neural network classifier can be ResNet-50 deep learning neural network classifier.

Therefore, by the methods that the testing X-ray image database is classified by the first deep learning neural network classifier and the second deep learning neural network classifier and then trained to achieve the convergence by the third deep learning neural network classifier, and the assessing result of CTR is output directly based on the testing X-ray image database of the subject according to the feature of CTR obtained by the aforementioned steps, not only the method 100 for assessing cardiothoracic ratio, the method 100a for assessing cardiothoracic ratio and the method 100b for assessing cardiothoracic ratio of the present disclosure can be used to calculate and provide the assessing CTR in real-time, but also it is favorable for formulating the subsequent medical plans. Furthermore, the resulting error caused by the different subjective interpretation habits of different analysts in the conventional method for assessing cardiothoracic ratio can be avoided. Moreover, by the method that the chest position and the heart position of the target chest X-ray image data are further confirmed by the fourth deep learning neural network classifier, it is favorable for the adjustment by the adjuster, so that the assessing result of CTR output by the method 100b for assessing cardiothoracic ratio of the present disclosure can be reconfirmed and optimize again, and the method 100b for assessing cardiothoracic ratio of the present disclosure has an excellent clinical application potential.

[Cardiothoracic Ratio Assessment System of the Present Disclosure]

Figure 4:
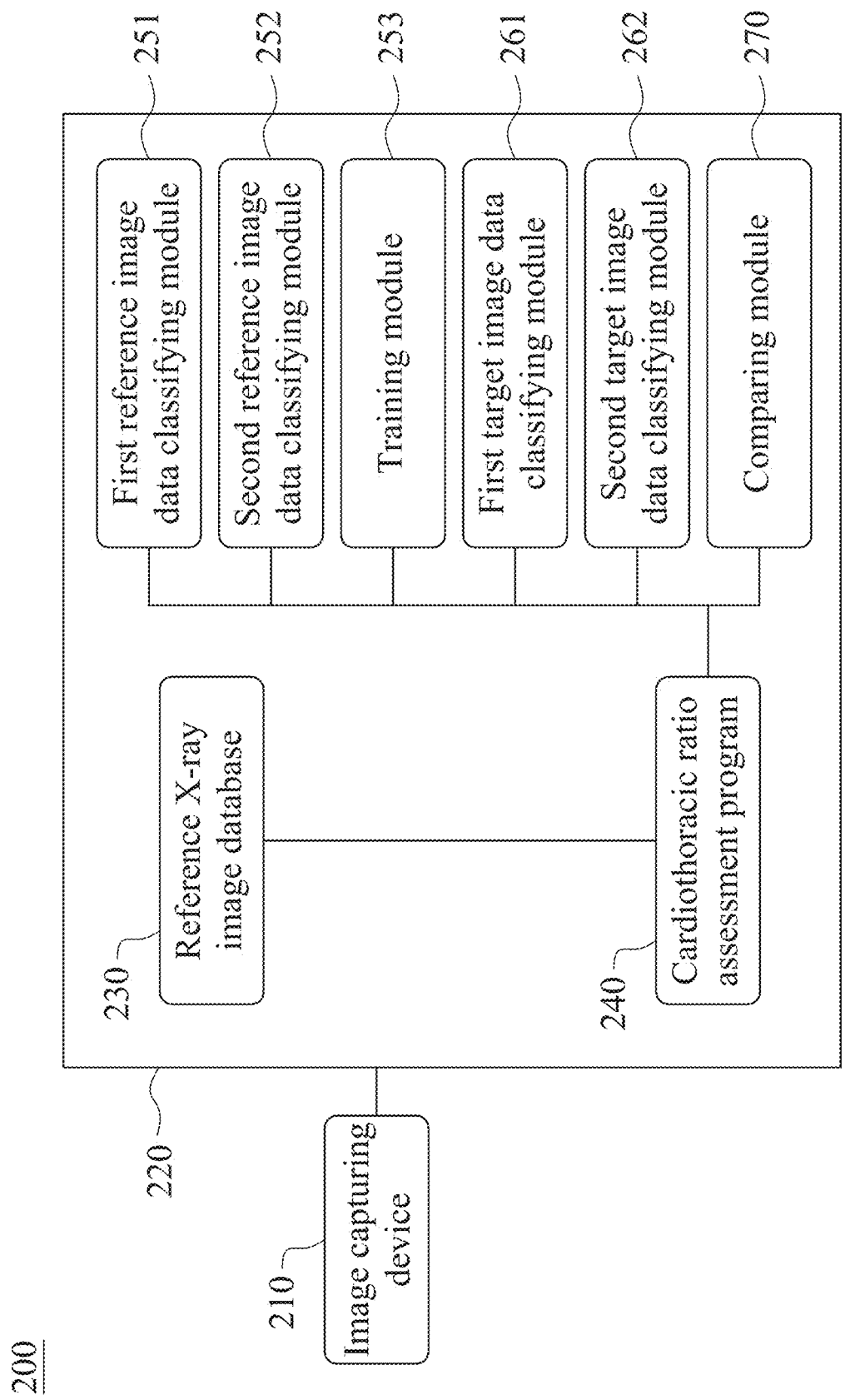
FIG. 4 is a block diagram of a cardiothoracic ratio assessment system according to still another embodiment of the present disclosure.

Please refer to FIG. 4, which is a block diagram of a cardiothoracic ratio assessment system 200 according to still another embodiment of the present disclosure. The cardiothoracic ratio assessment system 200 includes an image capturing device 210 and a processor 220.

The image capturing device 210 is for capturing a testing X-ray image database of a subject. In detail, the testing X-ray image database includes X-ray image data of each body part of the subject in X-ray examinations and includes the chest X-ray image data and the non-chest X-ray image data.

The processor 220 is electronically connected to the image capturing device 210, wherein the processor 220 includes a reference X-ray image database 230 and a cardiothoracic ratio assessment program 240, and the reference X-ray image database 230 includes a plurality of reference X-ray image datasets (not shown). The cardiothoracic ratio assessment program 240 includes a first reference image data classifying module 251, a second reference image data classifying module 252, a training module 253, a first target image data classifying module 261, a second target image data classifying module 262 and a comparing module 270.

The first reference image data classifying module 251 is for classifying each of the reference X-ray image datasets by the first deep learning neural network classifier as to obtain a plurality of training chest X-ray image data, wherein each of the training chest X-ray image data includes a PA chest X-ray image data or an AP chest X-ray image data. In particular, the reference X-ray image datasets include the chest X-ray image data with different examination postures and may include and the non-chest X-ray image data (that is, the X-ray image data may include the images of the chest and other parts of the body in one X-ray examination simultaneously). The chest X-ray image data and the non-chest X-ray image data of each of the reference X-ray image datasets can be classified by the first deep learning neural network classifier of the present disclosure so as to select the chest X-ray image data as the training chest X-ray image data of the present disclosure for the subsequent analysis. Furthermore, the first deep learning neural network classifier can be ResNet-50 deep learning neural network classifier.

The second reference image data classifying module 252 is for classifying the training chest X-ray image data by the second deep learning neural network classifier so as to obtain a plurality of training PA chest X-ray image data. In detail, each of the training chest X-ray image data will be classified by the second deep learning neural network classifier so as to obtain the PA chest X-ray image data which is clearer and with a normal-scale size, so that the assessing result of CTR with higher accuracy can be obtained. Furthermore, the second deep learning neural network classifier can be ResNet-50 deep learning neural network classifier.

The training module 253 is for capturing a diameter of thoracic cavity and a diameter of cardiac silhouette of each of the training PA chest X-ray image data by a deep learning calculating module automatically, and the diameter of thoracic cavity and the diameter of cardiac silhouette of the training PA chest X-ray image data are trained to achieve a convergence by the deep learning calculating module so as to obtain a third deep learning neural network classifier. Furthermore, the deep learning calculating module can be U-Net calculating module.

The first target image data classifying module 261 is for classifying the testing X-ray image database by the first deep learning neural network classifier so as to obtain a testing chest X-ray image data, wherein the testing chest X-ray image data includes a PA chest X-ray image data or an AP chest X-ray image data. In detail, the first deep learning neural network classifier can be used to classify the chest X-ray image data and the non-chest X-ray image data of the testing X-ray image database so as to select the testing chest X-ray image data of the subject for the subsequent analysis.

The second target image data classifying module 262 is for classifying the testing chest X-ray image data by the second deep learning neural network classifier so as to obtain a target chest X-ray image data. The target chest X-ray image data can be the PA chest X-ray image data. In detail, the testing X-ray image database will be classified by the second deep learning neural network classifier automatically so as to obtain the PA chest X-ray image data which is clearer and with a normal-scale size as the basis for assessing the CTR.

The comparing module 270 is for capturing a diameter of thoracic cavity and a diameter of cardiac silhouette of the target chest X-ray image data by the third deep learning neural network automatically, wherein the diameter of thoracic cavity and the diameter of cardiac silhouette of the target chest X-ray image data are trained to achieve a convergence by the third deep learning neural network so as to obtain a feature of CTR, and an assessing result of CTR is obtained according to the feature of CTR by the third deep learning neural network classifier. In detail, the comparing module 270 is used to automatically segment the heart portion and the lung portion of the target chest X-ray image data by the third deep learning neural network classifier. Then, a maximum transverse diameter of the thoracic cavity and a maximum transverse diameter of the heart will be marked with short straight lines by the third deep learning neural network classifier so as to obtain the feature of CTR corresponding, and the assessing result of CTR can be obtained according to the feature of CTR.

Therefore, by the methods that the testing X-ray image database is classified by the first deep learning neural network classifier and the second deep learning neural network classifier and then trained to achieve the convergence by the third deep learning neural network classifier, and the assessing result of CTR is output directly based on the testing X-ray image database of the subject according to the feature of CTR obtained by the aforementioned steps, not only the cardiothoracic ratio assessment system 200 of the present disclosure can be used to calculate and provide the assessing CTR in real-time, but also the resulting error caused by the different subjective interpretation habits of different analysts in the conventional method for assessing cardiothoracic ratio can be avoided, so that it is favorable for formulating the subsequent medical plans.

Figure 5:
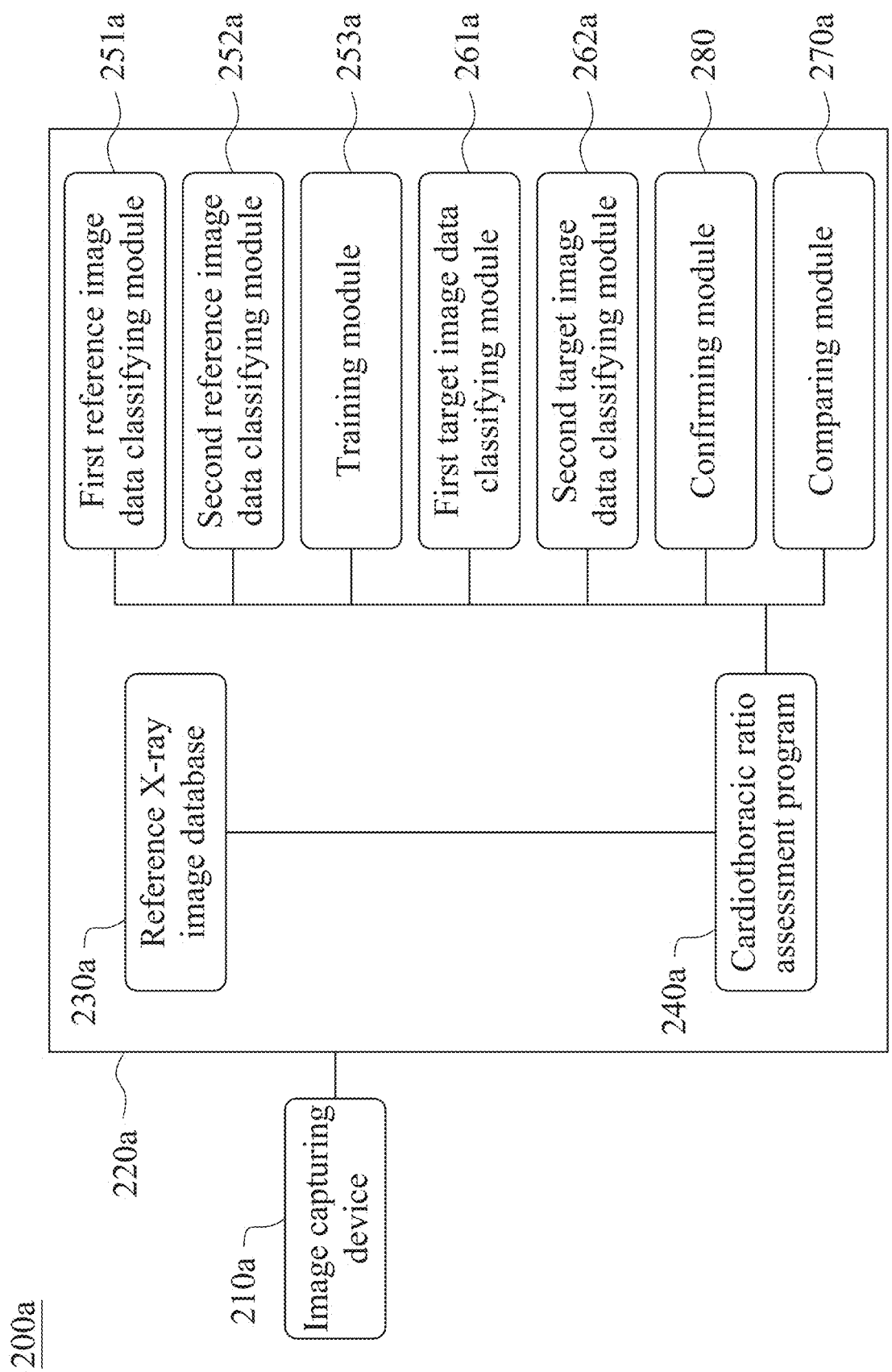
FIG. 5 is a block diagram of a cardiothoracic ratio assessment system according to yet another embodiment of the present disclosure.

Please refer to FIG. 5, which is a block diagram of a cardiothoracic ratio assessment system 200a according to yet another embodiment of the present disclosure. The cardiothoracic ratio assessment system 200a includes an image capturing device 210a and a processor 220a. The processer 220a includes a reference X-ray image database 230a and a cardiothoracic ratio assessment program 240a, wherein the cardiothoracic ratio assessment program 240a further includes a first reference image data classifying module 251*a*, a second reference image data classifying module 252*a*, a training module 253*a*, a first target image data classifying module 261*a*, a second target image data classifying module 262*a*, a confirming module 280 and a comparing module 270*a*. The first reference image data classifying module 251*a*, the second reference image data classifying module 252*a*, the training module 253*a*, the first target image data classifying module 261*a*, the second target image data classifying module 262*a* and the comparing module 270*a* of the cardiothoracic ratio assessment program 240*a* are the same as the first reference image data classifying module 251, the second reference image data classifying module 252, the training module 253, the first target image data classifying module 261, the second target image data classifying module 262 and the comparing module 270 of FIG. 4, so that the same details there between are not described again herein.

The confirming module 280 is for confirming a chest position and a heart position of the target chest X-ray image data by a fourth deep learning neural network classifier and then determining whether the segments of the chest position and the heart position are complete, smooth and not broken or not, and a reliability warning message is obtained according to the chest position and the heart position by the fourth deep learning neural network classifier. Furthermore, the diameter of thoracic cavity and the diameter of cardiac silhouette of the target chest X-ray image data can be adjusted by an adjuster so as to obtain an adjusted diameter of thoracic cavity and an adjusted diameter of cardiac silhouette. The adjusted diameter of thoracic cavity and the adjusted diameter of cardiac silhouette will be further trained to achieve a convergence by the fourth deep learning neural network classifier so as to obtain a secondary feature of CTR. At the same time, a reliability warning result of CTR can be obtained according to the secondary feature of CTR by the fourth deep learning neural network classifier, so that the assessing result of CTR output by the cardiothoracic ratio assessment system 200*a* of the present disclosure can be reconfirmed and optimized again. More preferably, the diameter of thoracic cavity and the diameter of cardiac silhouette of the target chest X-ray image data can be adjusted by the adjuster according to the reliability warning message. In particular, the fourth deep learning neural network classifier can be ResNet-50 deep learning neural network classifier.

Furthermore, although it is not shown in the figures, the cardiothoracic ratio assessment system of the present disclosure can further include a displayer, and the displayer is electronically connected to the image capturing device and the processor, wherein the displayer includes a user interface, and the assessing result of CTR and the reliability warning result of CTR are shown on the displayer. Accordingly, it is favorable for the adjuster to adjust the diameter of thoracic cavity and the diameter of cardiac silhouette directly by the user interface via the displayer and then obtaining the assessing result of CTR and the reliability warning result of CTR output by the cardiothoracic ratio assessment system of the present disclosure via the displayer. Thus, the use of the cardiothoracic ratio assessment system of the present disclosure is more convenient and has an excellent clinical application potential.

EXAMPLE

I. Reference X-Ray Image Database

The reference X-ray image database used in the present disclosure is the X-ray image data collected by China Medical University Hospital. This clinical research study is approved by China Medical University & Hospital Research Ethics Committee, which are numbered as CMUH106-REC3-118. The aforementioned reference X-ray image database includes the X-ray image datasets of 198 subjects which is a total of 200 X-ray image data (including 200 of continuous PA chest X-ray image data) for the subsequent analysis.

The following examples will be performed by the cardiothoracic ratio assessment system of the present disclosure supplemented by the method for assessing cardiothoracic ratio of the present disclosure so as to assess the assessing accuracy of the cardiothoracic ratio assessment system and the method for assessing cardiothoracic ratio of the present disclosure. The cardiothoracic ratio assessment system of the present disclosure can be the cardiothoracic ratio assessment system 200 or the cardiothoracic ratio assessment system 200*a* described as the foregoing statement, and the method for assessing cardiothoracic ratio of the present disclosure can be the method 100 for assessing cardiothoracic ratio, the method 100*a* for assessing cardiothoracic ratio or the method 100*b* for assessing cardiothoracic ratio, so that the details thereof are shown in the aforementioned paragraphs and not be described again herein.

II. Classification of Image Data

In the classification of image data, the chest X-ray image data of the reference X-ray image datasets in the reference X-ray image database will be selected by the first deep learning neural network classifier of the present disclosure, and then the chest X-ray image data will be classified by the second deep learning neural network classifier so as to obtain the PA chest X-ray image data for the subsequent analysis.

Figure 6B:
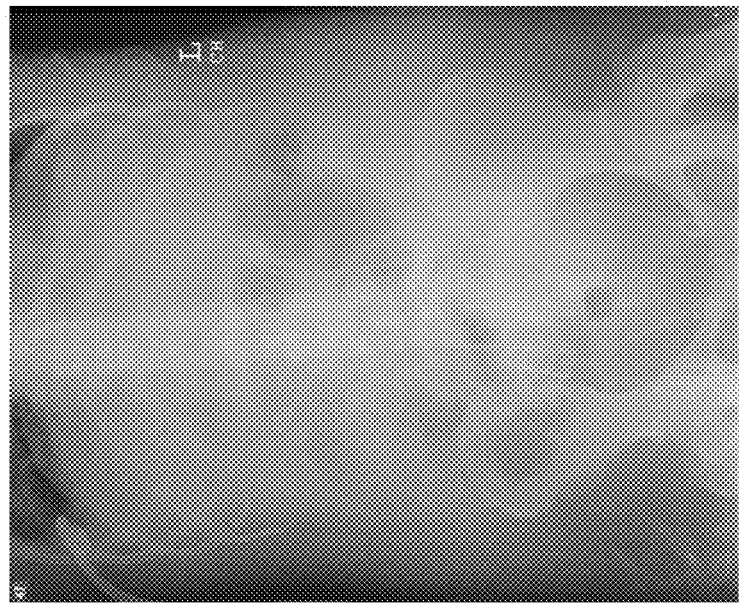
FIG. 6B shows a non-chest X-ray image data.
Figure 6A:
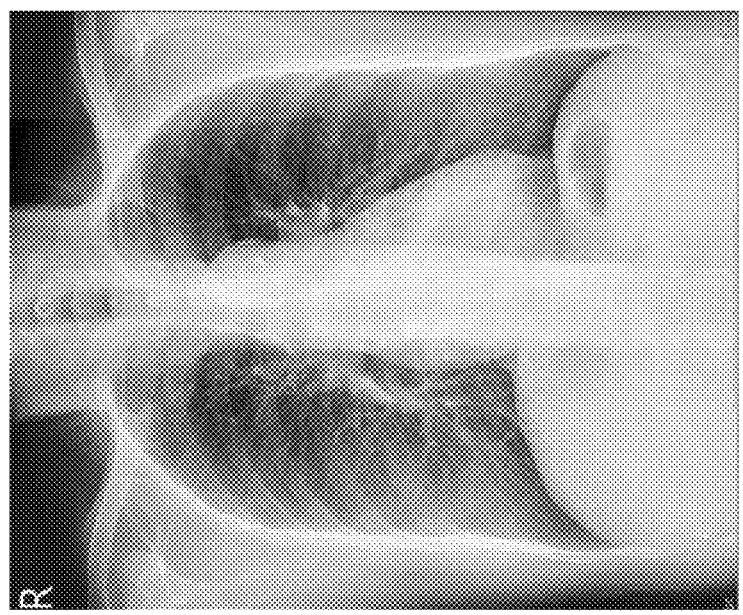
FIG. 6A shows a chest X-ray image data.

Please refer to FIG. 6A and FIG. 6B, wherein FIG. 6A shows a chest X-ray image data, and FIG. 6B shows a non-chest X-ray image data. As shown in FIG. 6A and FIG. 6B, compared with the chest X-ray image data, the non-chest X-ray image data may include the X-ray images of the chest and other parts of the body, resulting in that the positions of the thoracic cavity and the heart cannot be identified correctly. Furthermore, the sizes of the thoracic cavity and the heart shown in the non-chest X-ray image data also do not match the actual sizes of the thoracic cavity and the heart. Thus, the non-chest X-ray image data of the reference X-ray image datasets will be excluded by the first deep learning neural network classifier of the method for assessing cardiothoracic ratio and the cardiothoracic ratio assessment system of the present disclosure, and the chest X-ray image data thereof will be further used for the subsequent analysis.

Figure 7:
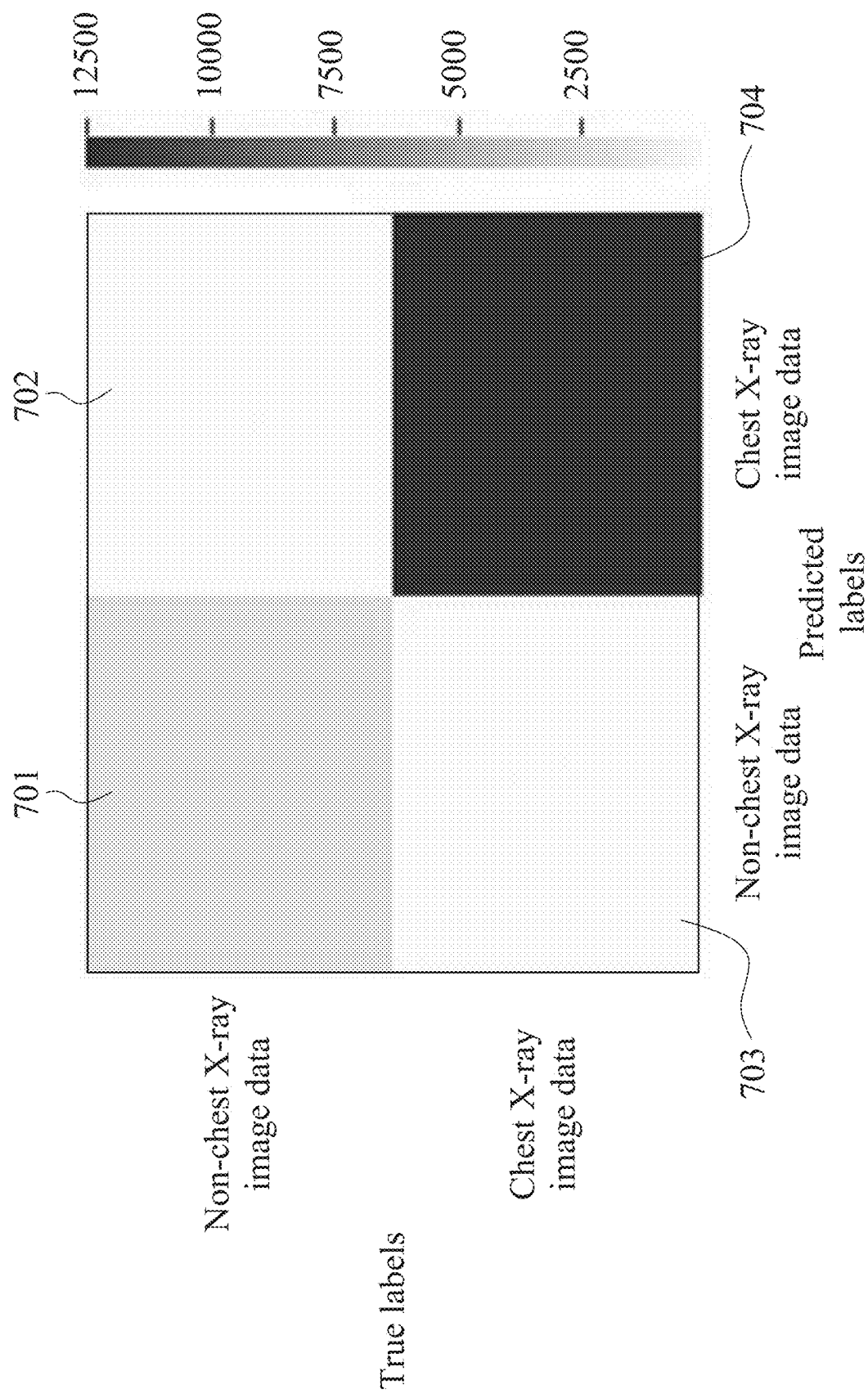
FIG. 7 is a confusion matrix diagram generated by the cardiothoracic ratio assessment system of the present disclosure which is used to classify the reference X-ray image datasets.

Please refer to FIG. 7, which is a confusion matrix diagram generated by the cardiothoracic ratio assessment system of the present disclosure which is used to classify the reference X-ray image datasets. As shown in the predicted labels of FIG. 7, a number of the non-chest X-ray image data falling in the true negative (TN) block 701 is 2048, a number of the chest X-ray image data falling in the false positive (FP) block 702 is 4, a number of the non-chest X-ray image data falling in the false negative (FN) block 703 is 5, and a number of the chest X-ray image data falling in the true positive (TP) block 704 is 12528. Furthermore, when the cardiothoracic ratio assessment system of the present disclosure is used to classify the reference X-ray image datasets and then further identify the non-chest X-ray image data and the chest X-ray image data, the precision thereof is 0.9986, the sensitivity thereof is 0.9988, and the accuracy is up to 0.9994. Accordingly, it is shown that the first deep learning neural network classifier of the method for assessing cardiothoracic ratio and the cardiothoracic ratio assessment system of the present disclosure can be used to identify the non-chest X-ray image data and the chest X-ray image data of the reference X-ray image datasets effectively and have a clinical application potential in related arts.

Figure 8B:
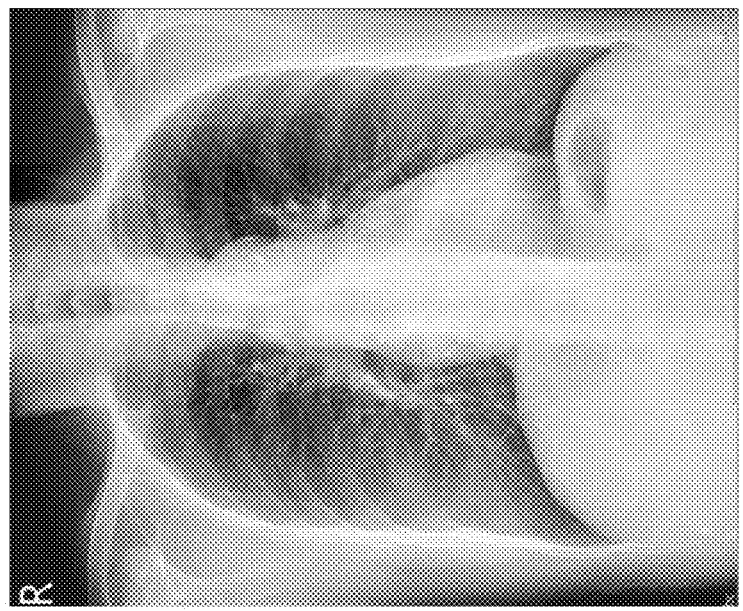
FIG. 8B shows a PA chest X-ray image data.
Figure 8A:
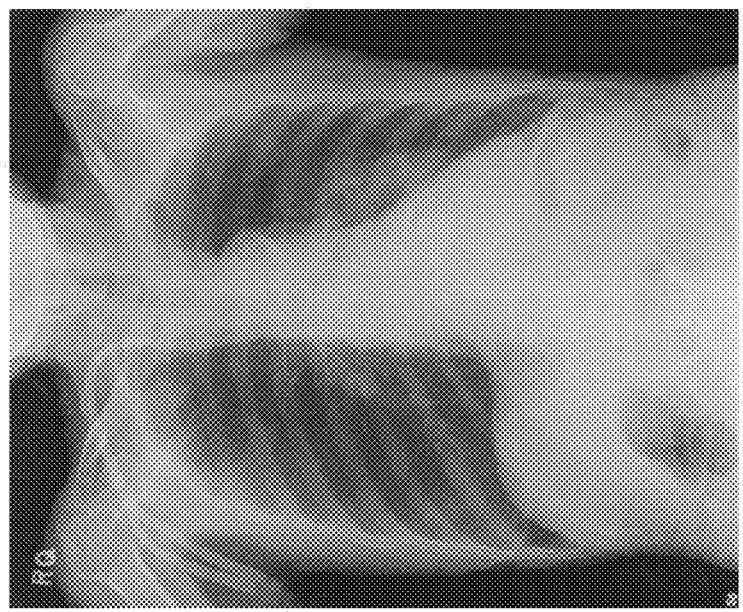
FIG. 8A shows an AP chest X-ray image data.

Please refer to FIG. 8A and FIG. 8B, wherein FIG. 8A shows an AP chest X-ray image data, and FIG. 8B shows a PA chest X-ray image data. In detail, as shown in FIG. 8A, when capturing the AP chest X-ray image data, the X-ray beams in a triangular pattern will emit from the front to the back of the patient, so that the obtained X-ray image data will be smaller than the actual size of the thoracic cavity, and the cardiac shadow will be enlarged in the AP chest X-ray image data. Thus, the error rate in capturing the diameter of thoracic cavity and the diameter of cardiac silhouette will be increased, resulting in affecting the accuracy of the assessing result of CTR. However, as shown in FIG. 8B, when capturing the PA chest X-ray image data of the subject, the X-ray beams will emit from the back to the chest of the patient which is in a standing position. At this time, the X-ray beams are parallel to each other, so that the obtained X-ray image data is clearer and with a normal-scale size. Furthermore, when capturing the X-ray image data in a standing position, the subject will maintain inhaling at the same time to expand the lungs so as to ensure sufficient inhalation, and then the expansion of the lungs will be maximized. Therefore, the PA chest X-ray image data of the reference X-ray image datasets and the PA chest X-ray image data of the subject will be used as the basis in the method for assessing cardiothoracic ratio and the cardiothoracic ratio assessment system of the present disclosure for assessing the CTR.

Figure 9:
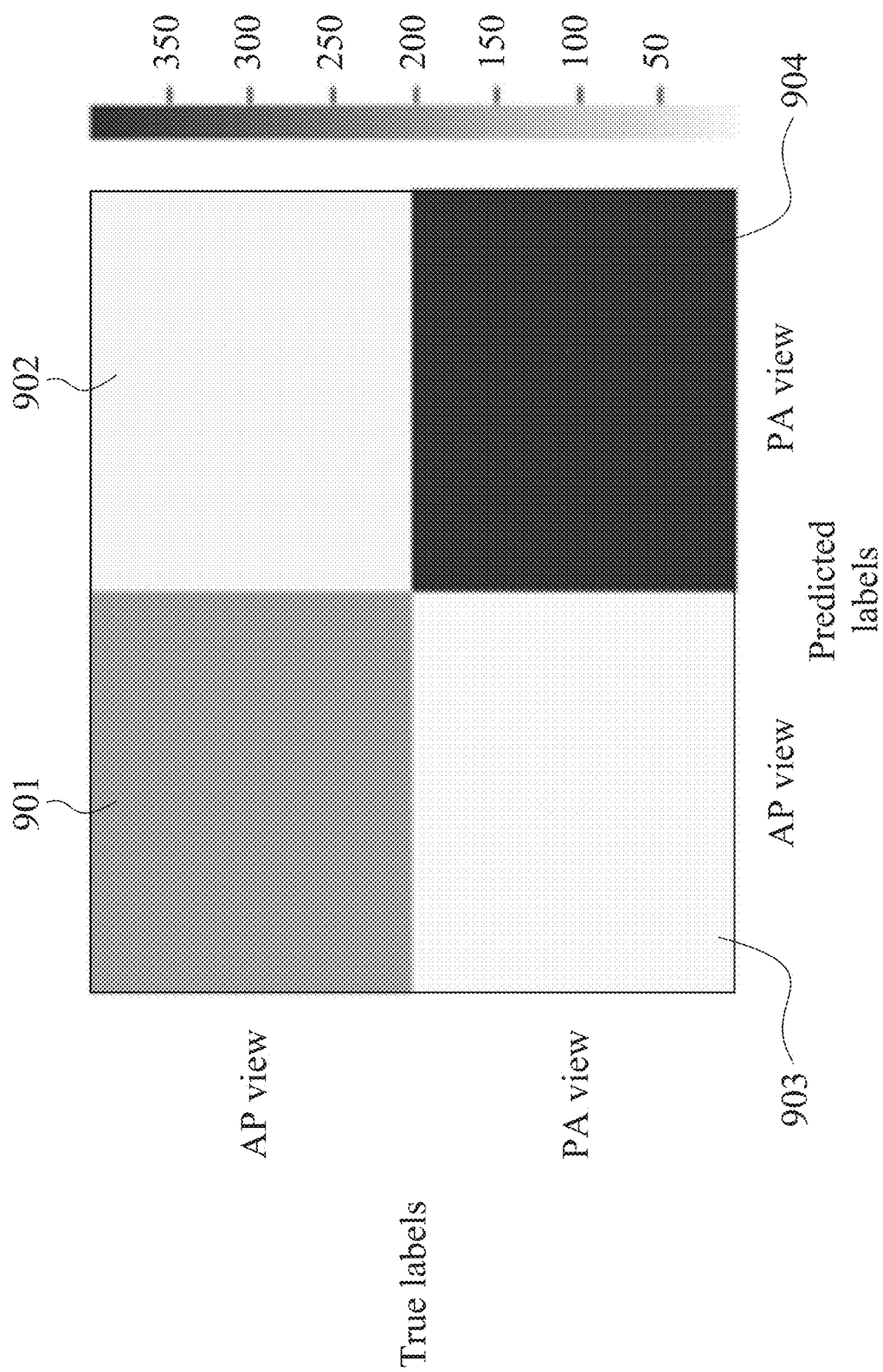
FIG. 9 is a confusion matrix diagram generated by the cardiothoracic ratio assessment system of the present disclosure which is used to classify the reference X-ray image datasets.

Please refer to FIG. 9, which is a confusion matrix diagram generated by the cardiothoracic ratio assessment system of the present disclosure which is used to classify the reference X-ray image datasets. When using the cardiothoracic ratio assessment system of the present disclosure to classify the reference chest X-ray image data with different examination postures, as shown in the predicted labels of FIG. 9, a number of the AP chest X-ray image data (shown as "AP view") falling in the true negative block 901 is 185, a number of the PA chest X-ray image data (shown as "PA view") falling in the false positive block 902 is 15, a number of the PA chest X-ray image data falling in the false negative block 903 is 3, and a number of the PA chest X-ray image data falling in the true positive block 904 is 397. Furthermore, when the cardiothoracic ratio assessment system of the present disclosure is used to classify the reference X-ray image datasets and then obtain the PA chest X-ray image data, the precision thereof is 0.96, the sensitivity thereof is 0.99, and the accuracy thereof is up to 0.97. Accordingly, it is shown that the second deep learning neural network classifier of the method for assessing cardiothoracic ratio and the cardiothoracic ratio assessment system of the present disclosure can be used to select the PA chest X-ray image data effectively for analysis and have a clinical application potential in related arts.

III. Reliability Analysis of the Method for Assessing Cardiothoracic Ratio and the Cardiothoracic Ratio Assessment System of the Present Disclosure When assessing the reliability of the method for assessing cardiothoracic ratio and the cardiothoracic ratio assessment system of the present disclosure, the testing X-ray image database of the subject will be classified by the first deep learning neural network classifier and the second deep learning neural network classifier of the present disclosure first so as to select the PA chest X-ray image data as the target chest X-ray image data for the subsequent analysis.

Figure 10A:
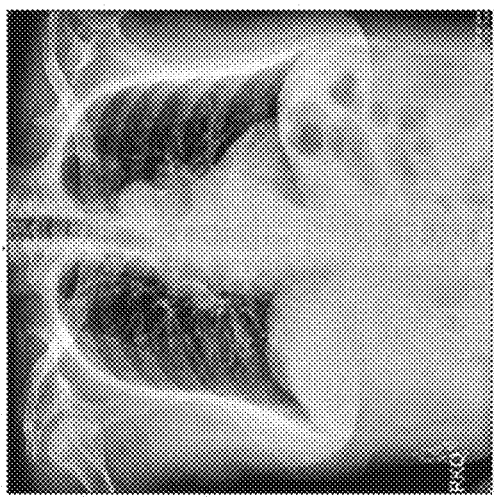
FIG. 10A is a target chest X-ray image data of the present disclosure.
Figure 10B:
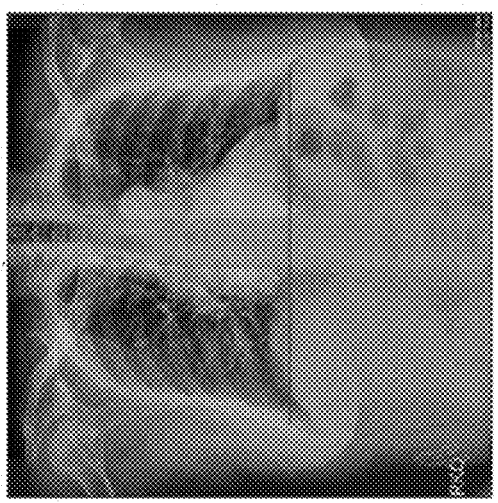
FIG. 10B is a schematic diagram of the cardiothoracic ratio assessment system of the present disclosure which is used to capture a diameter of thoracic cavity of the target chest X-ray image data of FIG. 10A.
Figure 10C:
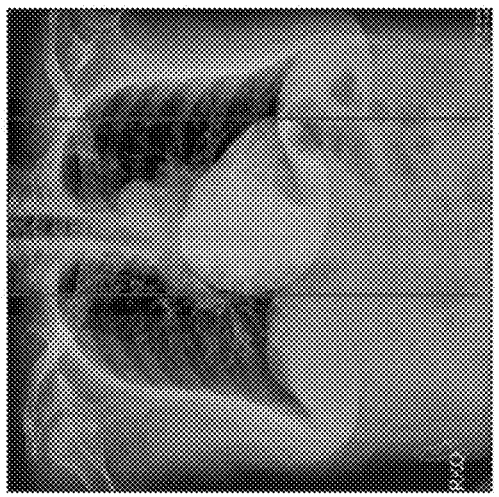
FIG. 10C is a schematic diagram of the cardiothoracic ratio assessment system of the present disclosure which is used to capture a diameter of cardiac silhouette of the target chest X-ray image data of FIG. 10A.

Please refer to FIG. 10A, FIG. 10B and FIG. 10C, wherein FIG. 10A is a target chest X-ray image data of the present disclosure, FIG. 10B is a schematic diagram of the cardiothoracic ratio assessment system of the present disclosure which is used to capture a diameter of thoracic cavity of the target chest X-ray image data of FIG. 10A, and FIG. 10C is a schematic diagram of the cardiothoracic ratio assessment system of the present disclosure which is used to capture a diameter of cardiac silhouette of the target chest X-ray image data of FIG. 10A. In detail, when the cardiothoracic ratio assessment system of the present disclosure is used to assess the CTR of the subject, as shown in FIG. 10A, FIG. 10B and FIG. 10C, the third deep learning neural network classifier of the present disclosure will be used to automatically segment the heart portion and the lung portion of the target chest X-ray image data. Then, a maximum transverse diameter of the thoracic cavity (as shown in FIG. 10B) and a maximum transverse diameter of the heart (as shown in FIG. 10C) will be marked with short straight lines by the third deep learning neural network classifier so as to capture the diameter of thoracic cavity and the diameter of cardiac silhouette, and then the feature of CTR corresponding will be obtained based thereon for following analysis. Thus, the assessing efficiency of the cardiothoracic ratio assessment system and the method for assessing cardiothoracic ratio of the present disclosure can be enhanced. After that, an assessing result of CTR is obtained according to the feature of CTR by the third deep learning neural network classifier. Then, the fourth deep learning neural network classifier of the present disclosure will be further used to confirm a chest position and a heart position of the target chest X-ray image data, and then the reliability warning message will be output according to the chest position and the heart position by the fourth deep learning neural network classifier. Furthermore, the diameter of thoracic cavity and the diameter of cardiac silhouette of the target chest X-ray image data can be adjusted by an adjuster according to the reliability warning message, and an adjusted diameter of thoracic cavity and an adjusted diameter of cardiac silhouette will be further trained to achieve a convergence by the fourth deep learning neural network classifier so as to obtain a secondary feature of CTR. At the same time, a reliability warning result of CTR can be obtained according to the secondary feature of CTR by the fourth deep learning neural network classifier.

Figure 11:
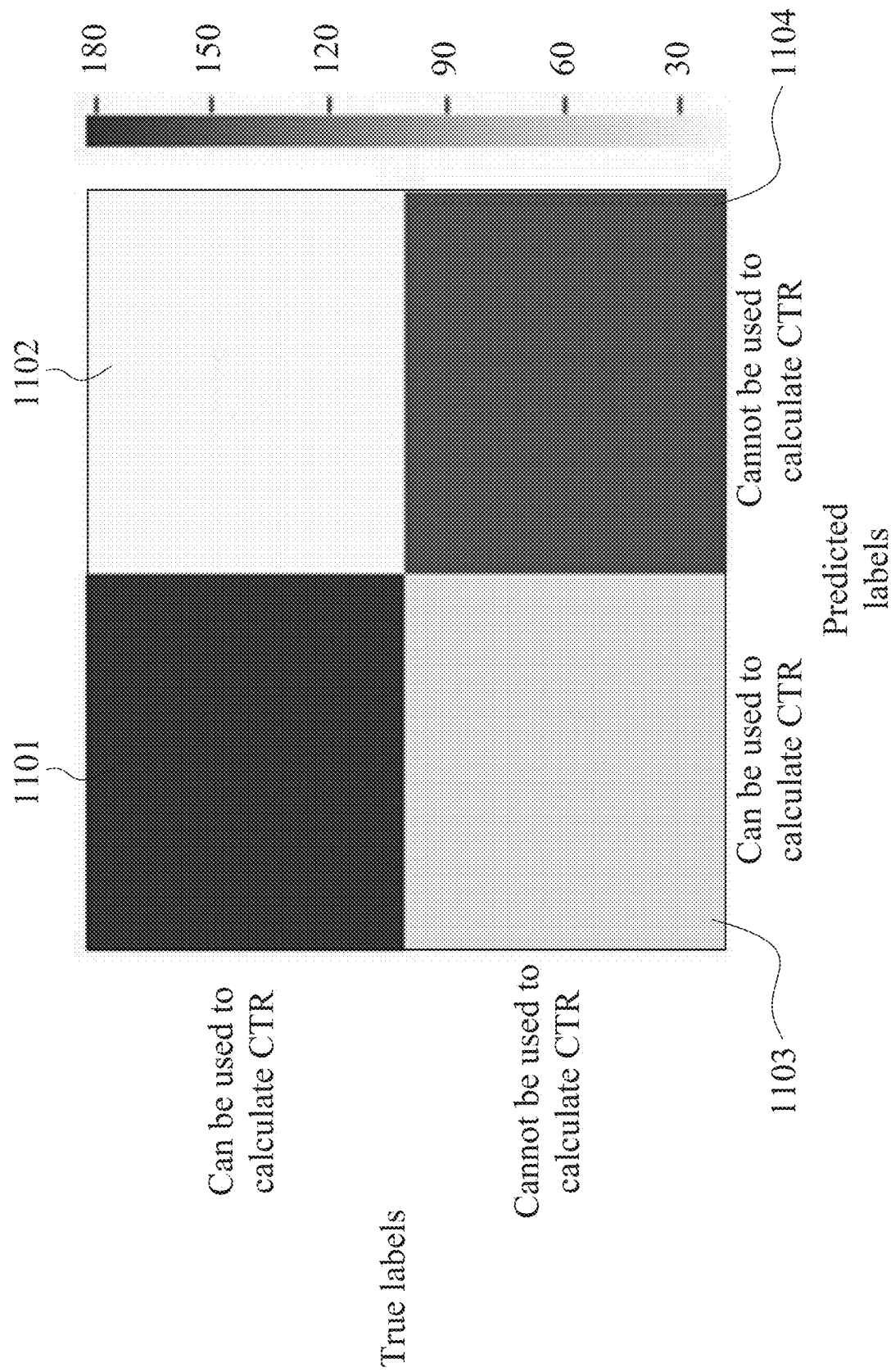
FIG. 11 is a confusion matrix diagram of a reliability warning result of CTR generated by the cardiothoracic ratio assessment system of the present disclosure which is used to analyze the PA chest X-ray image data of a subject by a fourth deep learning neural network classifier.

Please refer to FIG. 11, which is a confusion matrix diagram of a reliability warning result of CTR generated by the cardiothoracic ratio assessment system of the present disclosure which is used to analyze the PA chest X-ray image data of a subject by a fourth deep learning neural network classifier. As shown in the predicted labels of FIG. 11, a number of the PA chest X-ray image data falling in the true negative block 1101 which can be used to calculate CTR is 182, a number of the PA chest X-ray image data falling in the false positive block 1102 which cannot be used to calculate CTR is 18, a number of the PA chest X-ray image data falling in the false negative block 1103 which can be used to calculate CTR is 47, and a number of the PA chest X-ray image data falling in the true positive block 1104 which cannot be used to calculate CTR is 153. Furthermore, when the cardiothoracic ratio assessment system of the present disclosure is used to analyze whether the PA chest X-ray image data of the subject can be used to assess the CTR or not, the precision thereof is 0.895, the sensitivity thereof is 0.765, and the accuracy thereof is up to 0.8375.

Accordingly, it is shown that the method for assessing cardiothoracic ratio and the cardiothoracic ratio assessment system of the present disclosure can be used to analyze the chest X-ray image data effectively and assess the reliability thereof simultaneously, so that the assessing result of CTR which is optimize and has high accuracy can be obtained. Therefore, the method for assessing cardiothoracic ratio and the cardiothoracic ratio assessment system of the present disclosure have a clinical application potential in related arts.

Furthermore, in order to further confirm the accuracy for assessing the CTR of the cardiothoracic ratio assessment system of the present disclosure, the cardiothoracic ratio assessment system of the present disclosure is used to analyze 100 training chest X-ray image data, 47 verifying chest X-ray image data and 100 testing chest X-ray image data of the image database of Japanese Society of Radiological Technology (JSRT) and then output an assessing result of CTR correspondingly. According to the results of the aforementioned experiment, when the cardiothoracic ratio assessment system and the method for assessing cardiothoracic ratio of the present disclosure are used to analyze the continuous chest X-ray image data of the image database of JSRT and then assess the CTR of the subject, the precision thereof is up to 92%, and the precision for assessing whether the heart of the subject is suffered from hypertrophy (that is, the CTR>0.5) or not is up to 95%.

As shown in the aforementioned results, by the methods that the testing X-ray image database is classified by the first deep learning neural network classifier and the second deep learning neural network classifier and then trained to achieve the convergence by the third deep learning neural network classifier, and the assessing result of CTR is output directly based on the testing X-ray image database of the subject according to the feature of CTR obtained by the aforementioned steps, not only the assessing accuracy of the cardiothoracic ratio assessment system and the method for assessing cardiothoracic ratio of the present disclosure is excellent, but also the resulting error caused by the different subjective interpretation habits of different analysts in the conventional method for assessing cardiothoracic ratio can be avoided. Thus, the cardiothoracic ratio assessment system and the method for assessing cardiothoracic ratio of the present disclosure have an excellent clinical application potential.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A method for assessing cardiothoracic ratio (CTR), comprising:
   providing a testing X-ray image database of a subject;
   performing a first image data classifying step, wherein the testing X-ray image database is classified by a first deep learning neural network classifier so as to obtain a testing chest X-ray image data, and the testing chest X-ray image data comprises a PA (posterior-anterior view) chest X-ray image data or an AP (anterior-posterior view) chest X-ray image data;
   performing a second image data classifying step, wherein the testing chest X-ray image data is classified by a second deep learning neural network classifier so as to obtain a target chest X-ray image data;
   performing a feature extracting step, wherein a diameter of thoracic cavity and a diameter of cardiac silhouette of the target chest X-ray image data are captured automatically and then trained to achieve a convergence by a third deep learning neural network classifier so as to obtain a feature of CTR; and
   performing an assessing step, wherein an assessing result of CTR is obtained according to the feature of CTR by the third deep learning neural network classifier.

2. The method for assessing cardiothoracic ratio of claim 1, wherein the target chest X-ray image data is the PA chest X-ray image data.

3. The method for assessing cardiothoracic ratio of claim 1, wherein the first deep learning neural network classifier is ResNet-50 deep learning neural network classifier, and the second deep learning neural network classifier is ResNet-50 deep learning neural network classifier.

4. The method for assessing cardiothoracic ratio of claim 1, further comprising:
   performing a confirming step, wherein a chest position and a heart position of the target chest X-ray image data are confirmed by a fourth deep learning neural network classifier, and a reliability warning message is obtained according to the chest position and the heart position by the fourth deep learning neural network classifier.

5. The method for assessing cardiothoracic ratio of claim 4, wherein the diameter of thoracic cavity and the diameter of cardiac silhouette of the target chest X-ray image data are adjusted by an adjuster so as to obtain an adjusted diameter of thoracic cavity and an adjusted diameter of cardiac silhouette;
   wherein the adjusted diameter of thoracic cavity and the adjusted diameter of cardiac silhouette are trained to achieve a convergence by the fourth deep learning neural network classifier so as to obtain a secondary feature of CTR, and a reliability warning result of CTR is obtained according to the secondary feature of CTR by the fourth deep learning neural network classifier.

6. The method for assessing cardiothoracic ratio of claim 5, wherein the diameter of thoracic cavity and the diameter of cardiac silhouette of the target chest X-ray image data are adjusted by the adjuster according to the reliability warning message.

7. The method for assessing cardiothoracic ratio of claim 4, wherein the fourth deep learning neural network classifier is ResNet-50 deep learning neural network classifier.

8. The method for assessing cardiothoracic ratio of claim 1, further comprising:
   performing a model establishing step, and the model establishing step comprising:
      providing a reference X-ray image database, wherein the reference X-ray image database comprises a plurality of reference X-ray image datasets;
      performing a first reference image data classifying step, wherein each of the reference X-ray image datasets is classified by the first deep learning neural network classifier so as to obtain a plurality of training chest X-ray image data, and each of the training chest X-ray image data comprises a PA chest X-ray image data or an AP chest X-ray image data;

performing a second reference image data classifying step, wherein the training chest X-ray image data are classified by the second deep learning neural network classifier so as to obtain a plurality of training PA chest X-ray image data; and performing a reference feature extracting step, wherein a diameter of thoracic cavity and a diameter of cardiac silhouette of each of the training chest X-ray image data are captured automatically and then trained to achieve a convergence by a deep learning calculating module so as to obtain the third deep learning neural network classifier.

9. The method for assessing cardiothoracic ratio of claim 8, wherein the deep learning calculating module is U-Net calculating module.

10. A cardiothoracic ratio assessment system, comprising:
an image capturing device for capturing a testing X-ray image database of a subject; and
a processor electronically connected to the image capturing device, wherein the processor comprises a reference X-ray image database and a cardiothoracic ratio assessment program, and the reference X-ray image database comprises a plurality of reference X-ray image datasets;
wherein the cardiothoracic ratio assessment program comprises:
a first reference image data classifying module for classifying each of the reference X-ray image datasets by the first deep learning neural network classifier so as to obtain a plurality of training chest X-ray image data, wherein each of the training chest X-ray image data comprises a PA chest X-ray image data or an AP chest X-ray image data;
a second reference image data classifying module for classifying the training chest X-ray image data by the second deep learning neural network classifier so as to obtain a plurality of training PA chest X-ray image data;
a training module for capturing a diameter of thoracic cavity and a diameter of cardiac silhouette of each of the training PA chest X-ray image data by a deep learning calculating module automatically, wherein the diameter of thoracic cavity and the diameter of cardiac silhouette of the training PA chest X-ray image data are trained to achieve a convergence by the deep learning calculating module so as to obtain a third deep learning neural network classifier;
a first target image data classifying module for classifying the testing X-ray image database by the first deep learning neural network classifier so as to obtain a testing chest X-ray image data, wherein the testing chest X-ray image data comprises a PA chest X-ray image data or an AP chest X-ray image data;
a second target image data classifying module for classifying the testing chest X-ray image data by the second deep learning neural network classifier so as to obtain a target chest X-ray image data; and
a comparing module for capturing a diameter of thoracic cavity and a diameter of cardiac silhouette of the target chest X-ray image data by the third deep learning neural network automatically, wherein the diameter of thoracic cavity and the diameter of cardiac silhouette of the target chest X-ray image data are trained to achieve a convergence by the third deep learning neural network so as to obtain a feature of CTR, and an assessing result of CTR is obtained according to the feature of CTR by the third deep learning neural network classifier.

11. The cardiothoracic ratio assessment system of claim 10, wherein the target chest X-ray image data is the PA chest X-ray image data.

12. The cardiothoracic ratio assessment system of claim 10, wherein the first deep learning neural network classifier is ResNet-50 deep learning neural network classifier, and the second deep learning neural network classifier is ResNet-50 deep learning neural network classifier.

13. The cardiothoracic ratio assessment system of claim 10, wherein the deep learning calculating module is U-Net calculating module.

14. The cardiothoracic ratio assessment system of claim 10, further comprising:
a confirming module for confirming a chest position and a heart position of the target chest X-ray image data by a fourth deep learning neural network classifier, wherein a reliability warning message is obtained according to the chest position and the heart position by the fourth deep learning neural network classifier.

15. The cardiothoracic ratio assessment system of claim 14, wherein the fourth deep learning neural network classifier is ResNet-50 deep learning neural network classifier.

16. The cardiothoracic ratio assessment system of claim 14, wherein the diameter of thoracic cavity and the diameter of cardiac silhouette of the target chest X-ray image data are adjusted by an adjuster so as to obtain an adjusted diameter of thoracic cavity and an adjusted diameter of cardiac silhouette;
wherein the adjusted diameter of thoracic cavity and the adjusted diameter of cardiac silhouette are trained to achieve a convergence by the fourth deep learning neural network classifier so as to obtain a secondary feature of CTR, and a reliability warning result of CTR is obtained according to the secondary feature of CTR by the fourth deep learning neural network classifier.

17. The cardiothoracic ratio assessment system of claim 16, wherein the diameter of thoracic cavity and the diameter of cardiac silhouette of the target chest X-ray image data are adjusted by the adjuster according to the reliability warning message.

18. The cardiothoracic ratio assessment system of claim 15, further comprising:
a displayer electronically connected to the image capturing device and the processor, wherein the displayer comprises a user interface, and the assessing result of CTR and the reliability warning result of CTR are shown on the displayer.

* * * * *